US008203629B2

(12) United States Patent
Nagata

(10) Patent No.: US 8,203,629 B2
(45) Date of Patent: Jun. 19, 2012

(54) IMAGE SENSING APPARATUS AND CORRECTION METHOD

(75) Inventor: Keiji Nagata, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1090 days.

(21) Appl. No.: 11/877,216

(22) Filed: Oct. 23, 2007

(65) Prior Publication Data
US 2008/0100728 A1 May 1, 2008

(30) Foreign Application Priority Data

Oct. 26, 2006 (JP) .................................. 2006-291715
Oct. 26, 2006 (JP) .................................. 2006-291718

(51) Int. Cl.
*H04N 5/217* (2006.01)
(52) U.S. Cl. ............................................. 348/241
(58) Field of Classification Search ........... 348/241–251
See application file for complete search history.

(56) References Cited

U.S. PATENT DOCUMENTS

| 6,940,059 | B2 | 9/2005 | Mabuchi |
| 7,301,571 | B2 | 11/2007 | Kobayashi et al. |
| 7,391,448 | B2 | 6/2008 | Nishizawa et al. |
| 2003/0146369 | A1* | 8/2003 | Kokubun .................. 250/208.1 |
| 2005/0110884 | A1* | 5/2005 | Altice et al. ................. 348/302 |
| 2006/0114342 | A1* | 6/2006 | Egawa ........................ 348/241 |

FOREIGN PATENT DOCUMENTS

| CN | 1507743 A | 6/2004 |
| CN | 1527591 A | 9/2004 |
| CN | 1533160 A | 9/2004 |
| JP | 2001-028713 | 1/2001 |
| JP | 2003-018475 | 1/2003 |
| JP | 2003-333435 | 11/2003 |
| JP | 2004-159274 A | 6/2004 |
| JP | 2006-041935 A | 2/2006 |
| JP | 2006-222762 | 8/2006 |
| JP | 2006-229362 A | 8/2006 |

OTHER PUBLICATIONS

The above references were cited in a Dec. 5, 2008 Chinese Office Action that issued in Chinese Patent Application 200710163749.8, which is enclosed with English Translation.
The above references were cited in a Dec. 16, 2011 Japanese Office Action, which is enclosed without an English Translation, that issued in Japanese Patent Application No. 2006-291715.

* cited by examiner

*Primary Examiner* — David Ometz
*Assistant Examiner* — Dillon Durnford Geszvain
(74) *Attorney, Agent, or Firm* — Cowan, Liebowitz & Latman, P.C.

(57) ABSTRACT

An image sensing apparatus includes an image sensor provided with a plurality of pixels each having a photoelectric converter that receives light from an object and converts the received light to a signal, a semiconductor region to which the signal from the photoelectric converter is transferred, a transfer unit that transfers the signal of the photoelectric converter to the semiconductor region, and a readout unit that reads out a signal from the semiconductor region, and a correction unit that corrects a first signal read out from the photoelectric converter, based on a second signal obtained by reading out the signal accumulated in the semiconductor region.

6 Claims, 10 Drawing Sheets

F I G. 3A
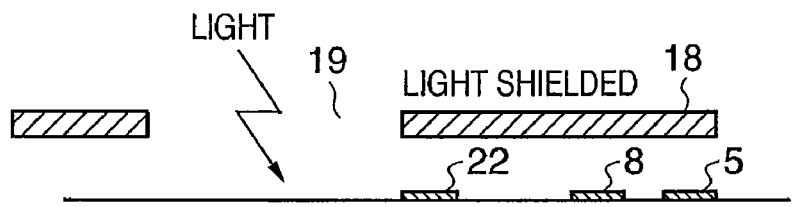
F I G. 3B
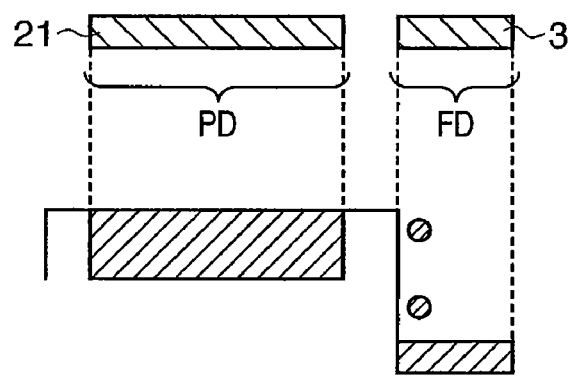

IMAGE SENSING APPARATUS AND CORRECTION METHOD

BACKGROUND OF THE INVENTION

1. Field of the Invention

The present invention relates to an image sensing apparatus and a correction method, and more specifically to a technique for correcting, in an image sensing apparatus that uses an image sensor, noise generated by the image sensor and the output of defective pixels in the image sensor.

2. Description of the Related Art

Heretofore, image sensing apparatuses such as digital cameras and video cameras that use an image sensor such as a CCD or a CMOS have become widespread. The pixel count of image sensors has increased with the improved performance of digital cameras, particularly in recent years.

While it is known that dark current occurs with these image sensors due to factors such as temperature, this dark current varies depending on the use environment, exposure period and the like. Therefore, a technique is known in which image capture is performed with the image sensor shielded just before or just after the actual image capture operation, and the obtained image (optical black image) is subtracted from the captured image (e.g., see "Description of the Related Art" in Japanese Patent Laid-Open No. 2003-333435). By thus subtracting the optical black image from the image of the object, image quality is improved through reducing the effects of tiny defects and fixed pattern noise in the dark current component.

A method is also disclosed in which a gain is applied so as to make fixed pattern noise stored after being extracted from an optical black image during the manufacture of a solid-state image sensor responsive to temperature change measured by a temperature sensor in the image sensing apparatus (e.g., see Japanese Patent Laid-Open No. 2003-018475). With this method, adverse effects resulting from the temperature dependency of fixed pattern noise is eliminated as a result of performing on the captured object image correction by subtracting fixed pattern noise to which a gain has been applied according to the temperature change.

The correction process disclosed in Japanese Patent Laid-Open No. 2003-333435 involving the subtraction of an optical black image enables the effects of fixed pattern noise and two-dimensional dark current unevenness on the screen, etc. to be reduced. However, the optical black image is taken by performing image capture with the image sensor shielded, for the same charge accumulation period as the actual image capture operation. Therefore, the shutter release time lag when capturing an image is increased, and the interval between first and second frames when performing continuous image capture is increased by the time taken to obtain the optical black image. Image sensing opportunities may be missed particularly at slow shutter speeds.

The method disclosed in Japanese Patent Laid-Open No. 2003-018475 seeks to eliminate the effects of temperature change in an image sensing apparatus, correction cannot be performed with high accuracy since it is not the temperature of the actual image sensor that is being measured and the temperature distribution on the screen varies depending on the image sensor.

With solid-state image sensors, on the other hand, defective pixels that occur in the manufacturing process are known to be one of the factors that degrade image quality and reduce manufacturing yield. Given the difficulty in completely eliminating defective pixels, it is generally known that image quality is improved by performing interpolation using pixels neighboring the defective pixels.

As for techniques that correct signals output from defective pixels, a method disclosed in the "Description of the Related Art" of Japanese Patent Laid-Open No. 2003-333435, for example, is known. This method firstly involves determining defective pixels using output values obtained by exposing the solid-state image sensor for a standard charge accumulation period under prescribed conditions when the solid-state image sensor is shipped from the factory, for instance. Information on output levels, positions and the like of defective pixels acquired at this time is stored, and when image capture is performed the output of the defective pixels is interpolated using the output levels of pixels neighboring the defective pixels, based on the stored information on output levels, positions and the like of defective pixels.

Further, techniques such as the following have been proposed for when shooting at slow shutter speeds. Firstly, an optical black image is taken prior to the actual image capture, and output levels at or above a prescribed output are extracted as defective pixels from the optical black image and stored. The extracted defective pixels are then corrected with respect to the image obtained by the actual image capture. So-called black thinning is performed on pixels other than the extracted defective pixels to subtract the output levels of pixels in the optical black image from the output levels of corresponding pixels obtained by the actual image capture. This enables correction to be performed that minimizes image degradation without the system breaking down, even with respect to an increase in the output levels of defective pixels that occurs when shooting at a slow shutter speed (e.g., see Japanese Patent Laid-Open No. 2001-028713).

A technique has also been proposed that involves providing plural pieces of correction data for correcting the output of defective pixels, and correcting the captured image after selecting using the optimal data selected in accordance with the shooting conditions such as sensitivity and charge accumulation period and the shooting environment such as temperature (e.g., see Japanese Patent Laid-Open No. 2003-333435).

Output levels of some defective pixels are caused by dark current and their output level varies greatly depending on the temperature and charge accumulation period. The output levels of defective pixels caused by dark current increase with the increase in the dark current due to the higher temperature and the longer exposure (the slower shutter speed).

A defective pixel affected by dark current described above causes the following phenomenon when charge accumulated in the defective pixel through an increase in dark current reaches the saturation level of the pixel. That is, a few percent of the output exceeding the saturation level of the pixel leaks into adjacent pixels. As a result, the output levels of the adjacent pixels become unnecessarily high, forming a cross-shaped defective pixel region, as shown in FIG. 10. In FIG. 10, the coordinates (n,n) indicate a defective pixel caused by dark current, and the increase in the output levels of pixels positioned at laterally and vertically adjacent thereto, that is, coordinates (n−1,n), (n+1,n) (n,n−1) and (n,n+1) as a result of charge leakage is shown.

With the method disclosed in the above Japanese Patent Laid-Open No. 2001-028713, the shutter release time lag from image sensing being instructed to image sensing actually being performed is lengthened, since time is needed prior to the actual image sensing to obtain an optical black image with the same charge accumulation period as the actual image sensing in order to extract defects. Particularly with shutter speeds slow enough for charge to leak into adjacent pixels, the shutter release time lag becomes extremely long. However, if attempts are made to shorten the shutter release time lag, it then becomes impossible to extract adjacent pixels into which charge has leaked, and correction cannot be performed.

Also, the following problems arise when attempting to perform correction such as disclosed in Japanese Patent Laid-Open No. 2003-333435 on a cross-shaped defective pixel region caused by dark current as shown in FIG. 10. That is, because output levels change depending on the temperature and charge accumulation period, information on whether or not to perform correction of adjacent pixels and addresses of the defective pixels need to be held for every condition with respect to each defective pixel, and the memory capacity for storing this data is required.

Also, in recent years, a proposal has been made to calculate saturated output using signals that have leaked into the floating diffusion (FD) portion of a CMOS sensor, and expand the dynamic range (e.g., see Japanese Patent Laid-Open No. 2006-222762). However, this does not amount to means for preventing image quality degradation, since it is impossible to judge whether signals that have leaked into the FD portion are caused by saturation due to light from the object or due to noise signals such as the dark current of defective pixels.

SUMMARY OF THE INVENTION

The present invention has been made in consideration of the above situation, and is to be able to correct dark output unevenness on the screen such as dark current unevenness in image signals, and to appropriately correct image signals in the case where defective pixels are saturated, without adding any special device configuration, and keeping the shutter release time lag short.

According to the present invention, the foregoing object is attained by providing an image sensing apparatus comprising: an image sensor provided with a plurality of pixels each having a photoelectric converter that receives light from an object and converts the received light to a signal, a semiconductor region to which the signal from the photoelectric converter is transferred, a transfer unit that transfers the signal converted by the photoelectric converter to the semiconductor region, and a readout unit that reads out a signal from the semiconductor region; and a correction unit that corrects a first signal read out from the photoelectric converter, based on a second signal obtained by reading out a signal accumulated in the semiconductor region during signal accumulation in the photoelectric converter.

According to the present invention, the foregoing object is also attained by providing a correction method for correcting a signal obtained from an image sensor provided with a plurality of pixels each having a photoelectric converter that receives light from an object and converts the received light to a signal, a semiconductor region to which the signal from the photoelectric converter is transferred, a transfer unit that transfers the signal converted by the photoelectric converter to the semiconductor region, and a readout unit that reads out signal from the semiconductor region, comprising: a first readout step of reading out a first signal from the photoelectric converter; a second readout step of reading out a second signal accumulated in the semiconductor region, prior to the first readout step; and a correction step of correcting the first signal based on the second signal.

According to the present invention, the foregoing object is also attained by providing an image sensing apparatus comprising: an image sensor provided with a plurality of pixels each having a photoelectric converter that receives light from an object and converts the received light to a signal, a semiconductor region to which the signal from the photoelectric converter is transferred, a transfer unit that transfers the signal converted by the photoelectric converter to the semiconductor region, and a readout unit that reads out a signal from the semiconductor region; a saturated charge amount calculation unit that calculates a saturated charge amount of the photoelectric converter based on a first signal obtained by reading out a signal flowing to the semiconductor region during signal accumulation in the photoelectric converter; and a correction unit that corrects a second signal read out from the photoelectric converter of a pixel adjacent to a pixel including the photoelectric converter whose saturated charge amount is calculated by the saturated charge amount calculation unit, according to a result of the calculation by the saturated charge amount calculation unit.

According to the present invention, the foregoing object is also attained by providing a correction method for correcting a signal obtained from an image sensor provided with a plurality of pixels each having a photoelectric converter that receives light from an object and converts the received light to a signal, a semiconductor region to which the signal from the photoelectric converter is transferred, a transfer unit that transfers the signal converted by the photoelectric converter to the semiconductor region, and a readout unit that reads out signal from the semiconductor region, comprising: a saturated charge amount calculation step of calculating a saturated charge amount of the photoelectric converter based on a first signal obtained by reading out a signal flowing to the semiconductor region during signal accumulation in the photoelectric converter; and a correction step of correcting a second signal read out from the photoelectric converter of a pixel adjacent to a pixel including the photoelectric converter whose saturated charge amount is calculated in the saturated charge amount calculation step, according to a result of the calculation in the saturated charge amount calculation step.

Further features of the present invention will become apparent from the following description of exemplary embodiments with reference to the attached drawings.

BRIEF DESCRIPTION OF THE DRAWINGS

FIGS. 3A and 3B show a cross-sectional view of a pixel and a conceptualization of the potential of the constituent elements according to the first embodiment of the present invention;

DESCRIPTION OF THE EMBODIMENTS

Preferred embodiments of the present invention will be described in detail in accordance with the accompanying drawings.

First Embodiment

Figure 1:
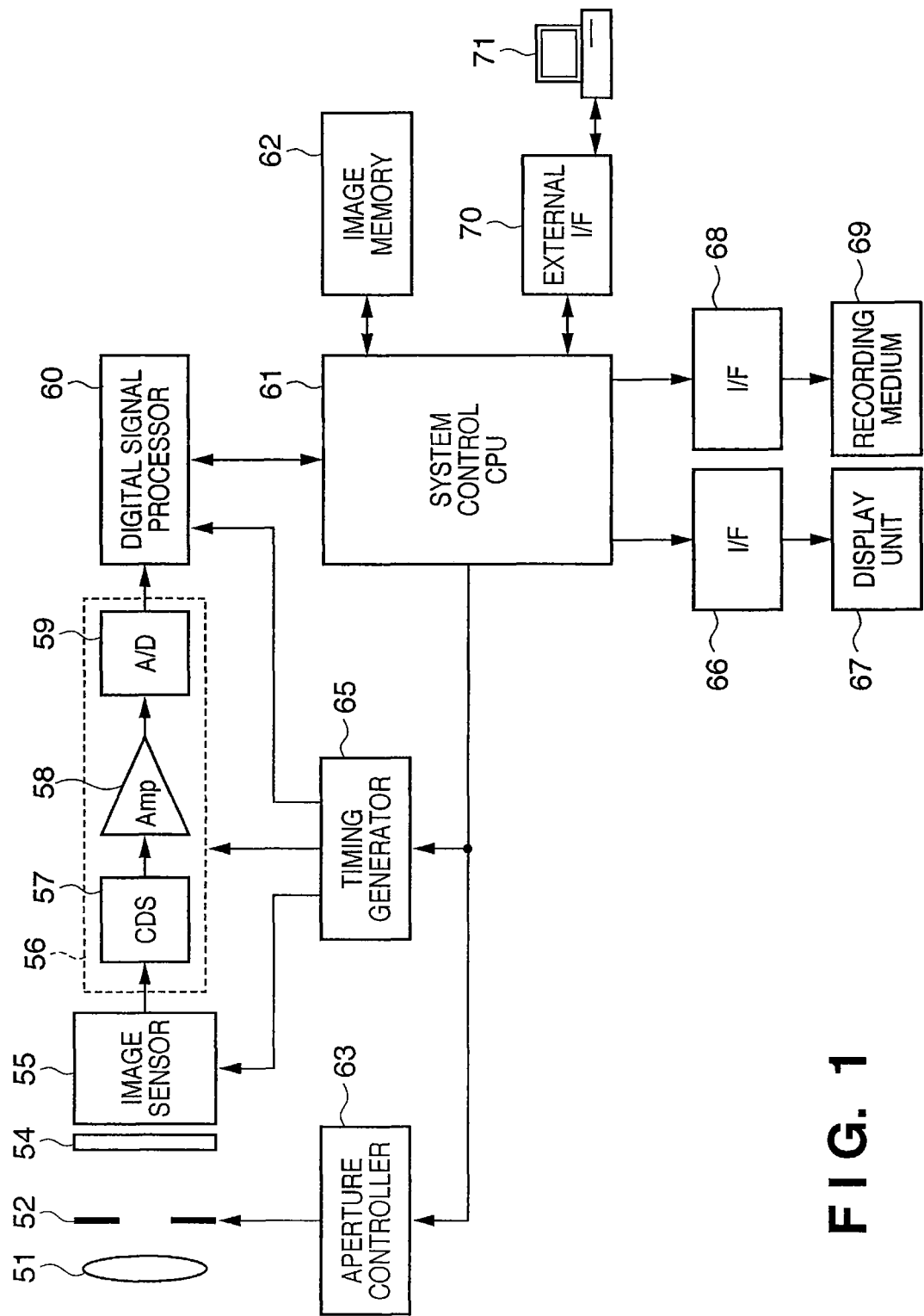
FIG. 1 is a block diagram showing the configuration of an image sensing apparatus according to a first embodiment of the present invention.

FIG. 1 is a block diagram showing the schematic configuration of a digital still camera, as an image sensing apparatus according to a first embodiment of the present invention.

In FIG. 1, reference number 51 denotes a lens that forms an optical image of the object on an image sensor 55, and reference number 52 denotes an aperture for regulating the amount of light that has passed through the lens 51. The aperture 52 is controlled by an aperture controller 63. Reference number 54 denotes an optical filter that restricts the spatial frequency or the wavelength of light incident on the image sensor 55, and reference number 55 denotes an image sensor that converts the optical image of the object formed via the lens 51 to an electrical image signal. Reference number 56 denotes an analog front end that performs analog processing and analog-to-digital conversion on the image signal output from the image sensor 55. The analog front end 56 is constituted by a correlated double sampling (CDS) circuit 57, an amplifier 58 that regulates signal gain, and an A/D converter 59 that digitizes analog signals. Reference number 60 denotes a digital signal processor that performs various types of correction on digital image data output from the analog front end 56, and compresses image data.

Reference number 65 denotes a timing generator that outputs various timing signals to the image sensor 55, the analog front end 56 and the digital signal processor 60, and reference number 61 denotes a system control CPU that controls various calculations and the digital still camera as a whole. Reference number 62 denotes an image memory for temporarily storing image data, reference number 66 denotes a display interface for displaying sensed images, and reference number 67 denotes a display unit such as an LCD. Reference number 68 denotes a recording interface for recording on and reading out from recording media, reference number 69 denotes a removable recording medium such as a semiconductor memory for recording image data and additional data, and reference number 70 denotes an external interface for communicating with an external computer 71 or the like.

Figure 2:
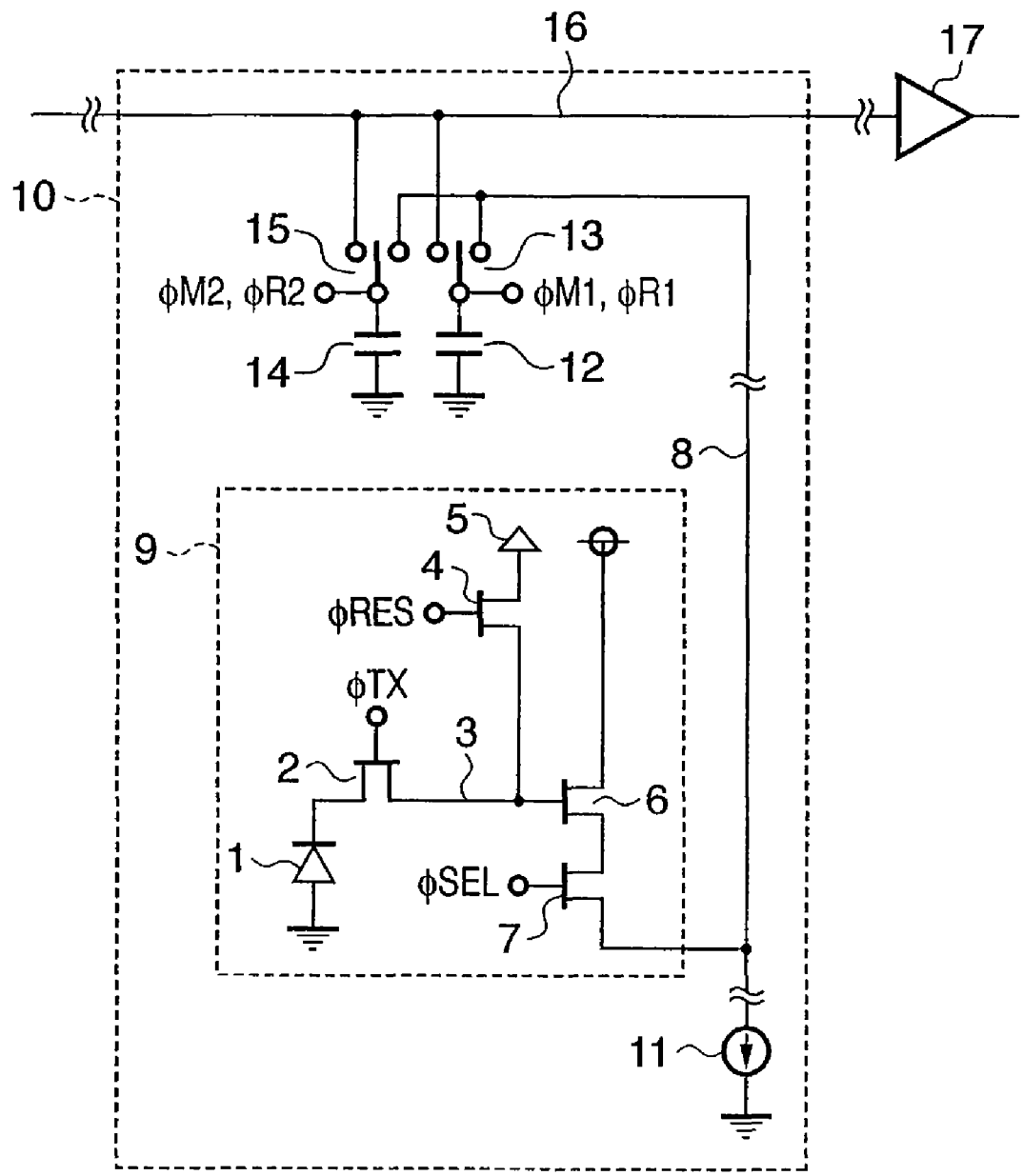
FIG. 2 is a circuit diagram mainly showing the configuration of primarily one pixel of an image sensor according to the first embodiment of the present invention.

FIG. 2 shows the circuitry of primarily one pixel of the image sensor 55, with the configuration of a CMOS sensor being shown here.

In FIG. 2, reference number 1 denotes a photodiode (PD) connected to a floating diffusion (FD) portion 3 via a transfer switch 2. The FD portion 3 is connected to a power line 5 that supplies a reset voltage via a reset switch 4. The FD portion 3 forms the gate of a field-effect transistor (FET) 6. The drain of the FET 6 is connected to a prescribed voltage, and the source is connected to a vertical output line 8 via a selection switch 7. A pixel 9 is constituted by the above elements. A plurality of pixels having a similar configuration are constituted in line along the vertical output line 8 to constitute a column 10, and an area sensor is constituted by horizontally configuring a plurality of columns having a similar configuration.

At least one constant current source 11 is connected to each of the vertical output lines 8, and the voltage of the vertical output line 8 is determined by the charge of the FD portion 3 of a selected pixel. A condenser 12 is connected as a memory for temporarily storing pixel output to each vertical output line 8 via a switch 13, and a condenser 14 is connected as a memory for temporarily storing saturated output via a switch 15. These condensers 12 and 14 are respectively connected to a readout line 16 via the switches 13 and 15, and pixel output stored in the condensers 12 and 14 is read out from the readout line 16 via an output amplifier 17.

FIG. 3A is a schematic diagram showing a cross-sectional configuration of the PD 1 and the FD portion 3 of the pixel 9 shown in FIG. 2, and FIG. 3B shows a conceptualization of the potential of the constituent elements when saturated. Note that the same reference numerals are appended to constituent elements corresponding to FIG. 2.

In FIG. 3A, reference number 21 denotes a diffusion region of the PD 1, reference number 22 denotes a gate electrode of the transfer switch 2, reference number 3 denotes the floating diffusion (FD) portion (semiconductor diffusion region), reference number 19 denotes an opening in a light-shielding film over the PD 1, and reference number 18 denotes the light-shielding film over the FD portion 3. Reference number 8 denotes the vertical signal line, and reference number 5 denotes the power line. As shown in FIG. 3B, charge generated in the PD 1 leaks into the FD portion 3 when saturated.

Figure 4:
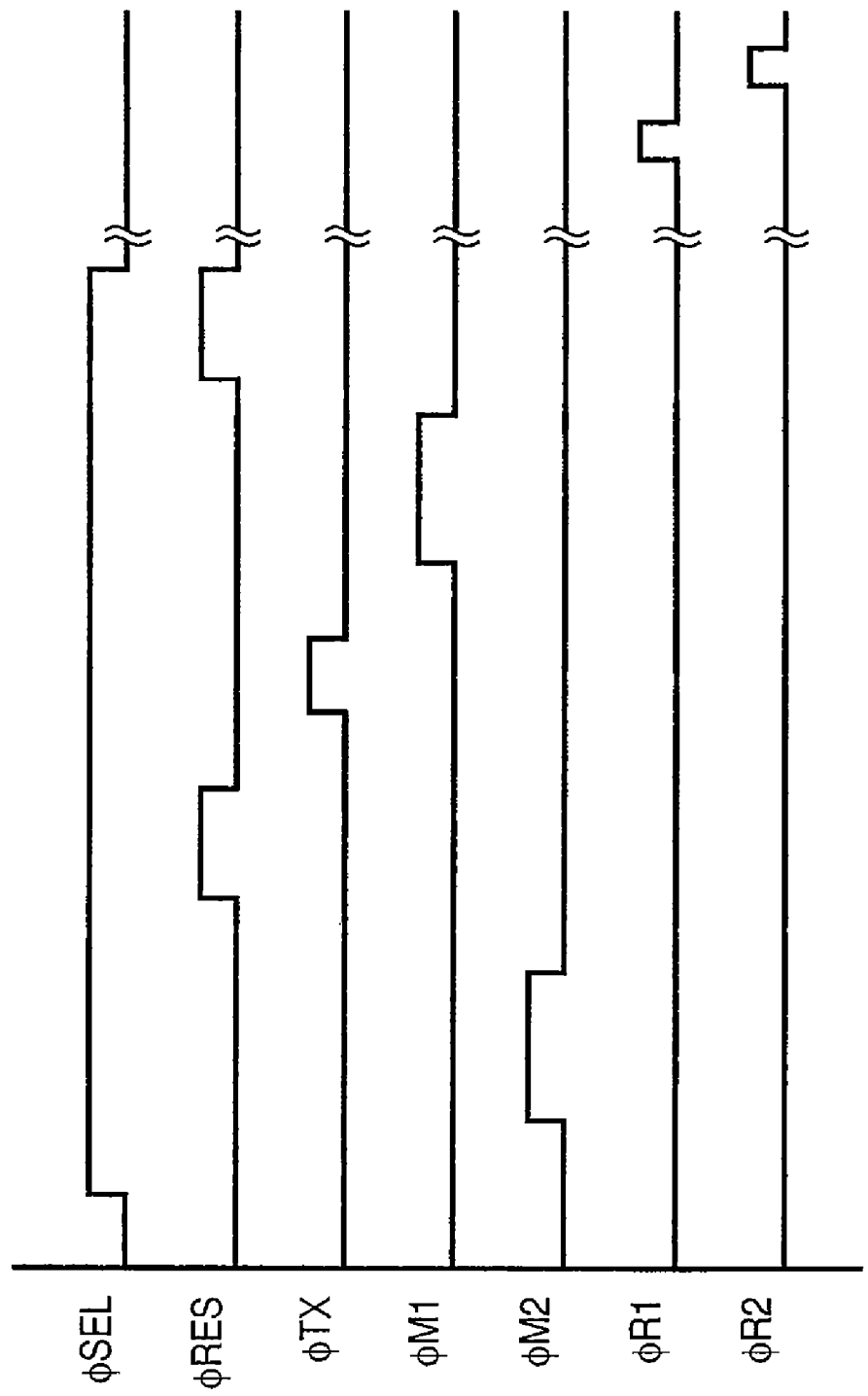
FIG. 4 is a timing chart for driving the image sensor according to the first embodiment of the present invention.

FIG. 4 shows the timing of different pulses output from the timing generator 65. The operations will be described hereinafter, with reference to FIG. 4.

When selecting a certain pixel, the selection switch 7 of the pixel to be selected is turned on by setting the selection pulse φSEL to high. Because the FD portion 3 is composed of a diffusion region similarly to the PD 1, which is a common photoelectric converter, electron-hole pairs constituting optical signal charge are generated at this time by incident stray light and heat. Consequently, the FD portion 3 works equivalently as a photoelectric converter. Signal charge is thus generated in the FD portion 3 by small light emissions and heat generated by the devices and circuitry in the image sensing apparatus, and the charge (noise component) caused by these factors is accumulated. Consequently, the FD portion 3 preferably is constituted to have characteristics that approach characteristics for generating charge when the PD 1 is shielded.

The charge (noise component) thus accumulated in the FD portion 3 prior to the charge of the PD 1 being transferred via the transfer switch 2 undergoes charge/voltage conversion by the FET 6, and a voltage corresponding to the charge is output to the vertical output line 8. By setting the memory pulse φM2 to high and connecting the switch 15 to the vertical output line 8 in this state, a voltage corresponding to the read charge of the noise component is temporarily stored in the condenser 14.

Then, the reset switch 4 is turned on by setting the reset pulse φRES to high, resetting the FD portion 3 to a prescribed reset voltage. Next, the transfer switch 2 is turned on by setting the transfer pulse φTX to high, and the charge (optical component) accumulated in the PD 1 is read out to the FD portion 3. The charge of the optical component read out to the FD portion 3 undergoes charge/voltage conversion by the FET 6, and a corresponding voltage is output to the vertical output line 8. By setting the memory pulse φM1 to high and connecting the switch 13 to the vertical output line 8 in this state, the voltage corresponding to the charge of the optical component is temporarily stored in the condenser 12.

Next, the switch 13 is connected to the readout line 16 by setting the readout pulse φR1 to high, and the temporarily stored voltage corresponding to the charge of the optical component is output to the readout line 16 and output via the output amplifier 17 as an optical signal. Further, the switch 15 is then connected to the readout line 16 by setting the readout pulse φR2 to high, and the voltage corresponding to the charge of the noise component is output to the readout line 16 and output via the output amplifier 17 as a noise signal.

The optical and noise signals thus output from the image sensor 55 are converted to digital data by the A/D converter 59, and sent to the digital signal processor 60 of FIG. 1 as an optical output image based on the optical signals and a noise image showing the noise level and region based on the noise signals.

Figure 5:
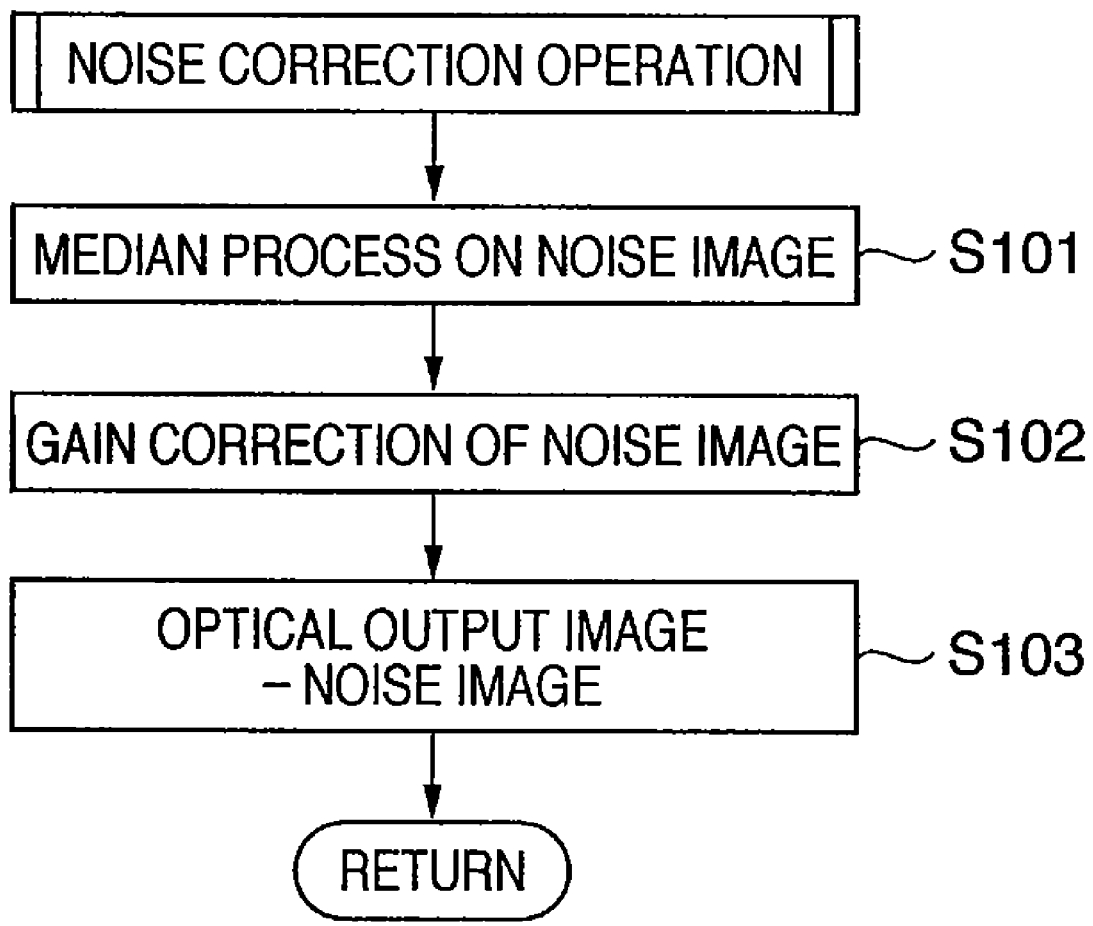
FIG. 5 is a flowchart for illustrating a process of correcting a noise signal according to the first embodiment of the present invention.

The process of correcting dark output executed in the digital signal processor 60 in the first embodiment will be described next, with reference to the flowchart of FIG. 5.

Since pixel defects generated per pixel differ between the FD portion 3 and the PD 1, a median process is performed in step S101 on the noise image over a 5×5 pixel range, canceling the noise of each pixel and extracting only screen unevenness in the noise image caused by dark output. Next, in step S102, gain correction is performed in order to correct the difference in sensitivity and the difference in the intensity with which dark current occurs between the PD 1 and the FD portion 3. Since the FD portion 3 is more sensitive and has a greater incidence of dark current compared to the PD 1, the level of the noise image is reduced. Next, in step S103, the corrected noise image is subtracted from the optical output image, completing the dark output correction.

According the above processing, the two charge accumulation periods conventionally needed to acquire the actual image and an optical black image can be reduced to one charge accumulation period, since the correction is performed without acquiring an optical black image.

The operations when sensing an image in a digital still camera that performs the foregoing correction process will be described next.

Turning on a power switch (now shown) turns on the main power, the power of the control system, and the power of image sensing-related circuitry such as the analog front end 56.

Then, in order to control the light exposure, the system control CPU 61 fully opens the aperture 52 via the aperture controller 63. The image signal output from the image sensor 55 in this state is input to the digital signal processor 60, after being converted by the analog front end 56. The system control CPU 61 performs an exposure calculation based on this data. Brightness is judged using the result of this photometry, and the system control CPU 61 controls the aperture 52 according to the judged brightness.

Next, the high frequency component is extracted from the image signal output from the image sensor 55, and a sharpness is calculated by the system control CPU 61. Then, the sharpness is calculated again after driving the lens 51, and it is judged whether the object is focused (whether sharpness is maximized). If judged that the object in not focused, the sharpness is calculated again performed after driving the lens 51. This control is repeated until sharpness is maximized, and after maximizing sharpness (after confirming that the object is focused), the electronic shutter function of the image sensor 55 is used to start and end the actual exposure as described above. An optical output image and a noise image are then output sequentially by line. The image signal output from the image sensor 55 undergoes noise reduction such as correlated double sampling by the analog front end 56, amplification, and A/D conversion to be digitized.

The digitized image signal is written to the image memory 62 by the system control CPU 61, after undergoing the above processing via the digital signal processor 60. Then, the image data stored in the image memory 62 is recorded via the recording interface 68 on a removable recording medium 69 such as a semiconductor memory under control of the system control CPU 61. The captured image data is also displayed via the display interface 66 on a display unit 67 such as an LCD. Alternatively, the captured image data may be input directly to a computer 71 or the like via the external interface 70, and undergo image processing.

Second Embodiment

A second embodiment of the present invention will be described next.

Saturation of the FD portion 3 by the charge of the noise component when shooting at a slow shutter speed is problematic in the case where dark current generated in the FD portion 3 is greater than in the PD 1, as occurs in defective pixels. A method for solving this problem will be described in the second embodiment.

Note that since the basic device configuration is similar to that described with reference to FIGS. 1 to 3B in the first embodiment, description thereof will be omitted.

Figure 6:
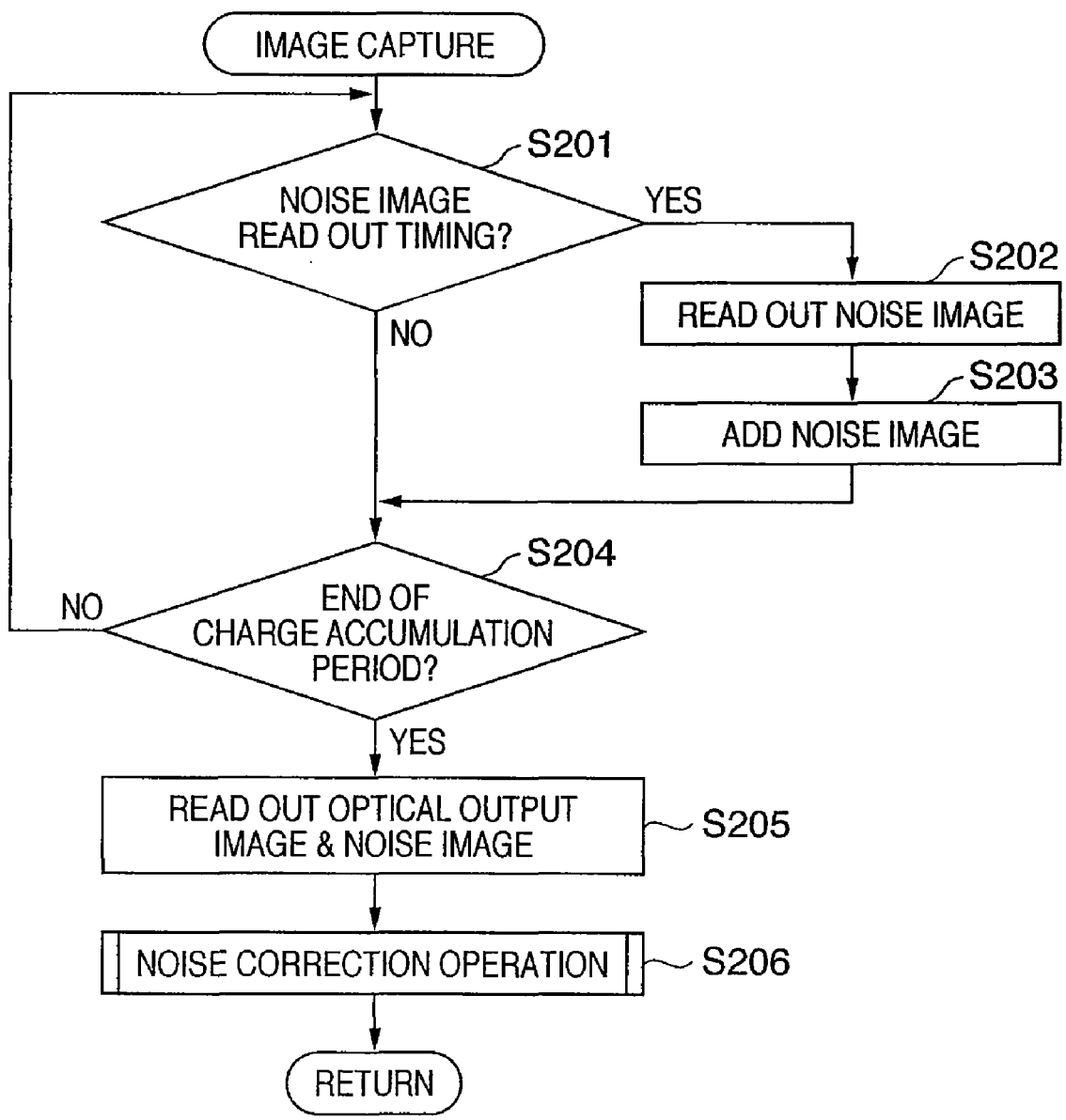
FIG. 6 is a flowchart for illustrating a process of correcting a noise signal according to a second embodiment of the present invention.

FIG. 6 is a flowchart for illustrating a process of correcting the noise signal according to the second embodiment. In the second embodiment, the charge of the noise component is read out from the FD portion 3 a plurality of times during the charge accumulation period at prescribed time intervals, and added together.

Firstly, after resetting the entire screen of the image sensor 55, it is judged in step S201 whether the timing for read out a noise image has arrived (whether a prescribed period has elapsed), and if the timing for reading out a noise image has arrived, the processing proceeds to step S202, where a noise image is read out.

Figure 7:
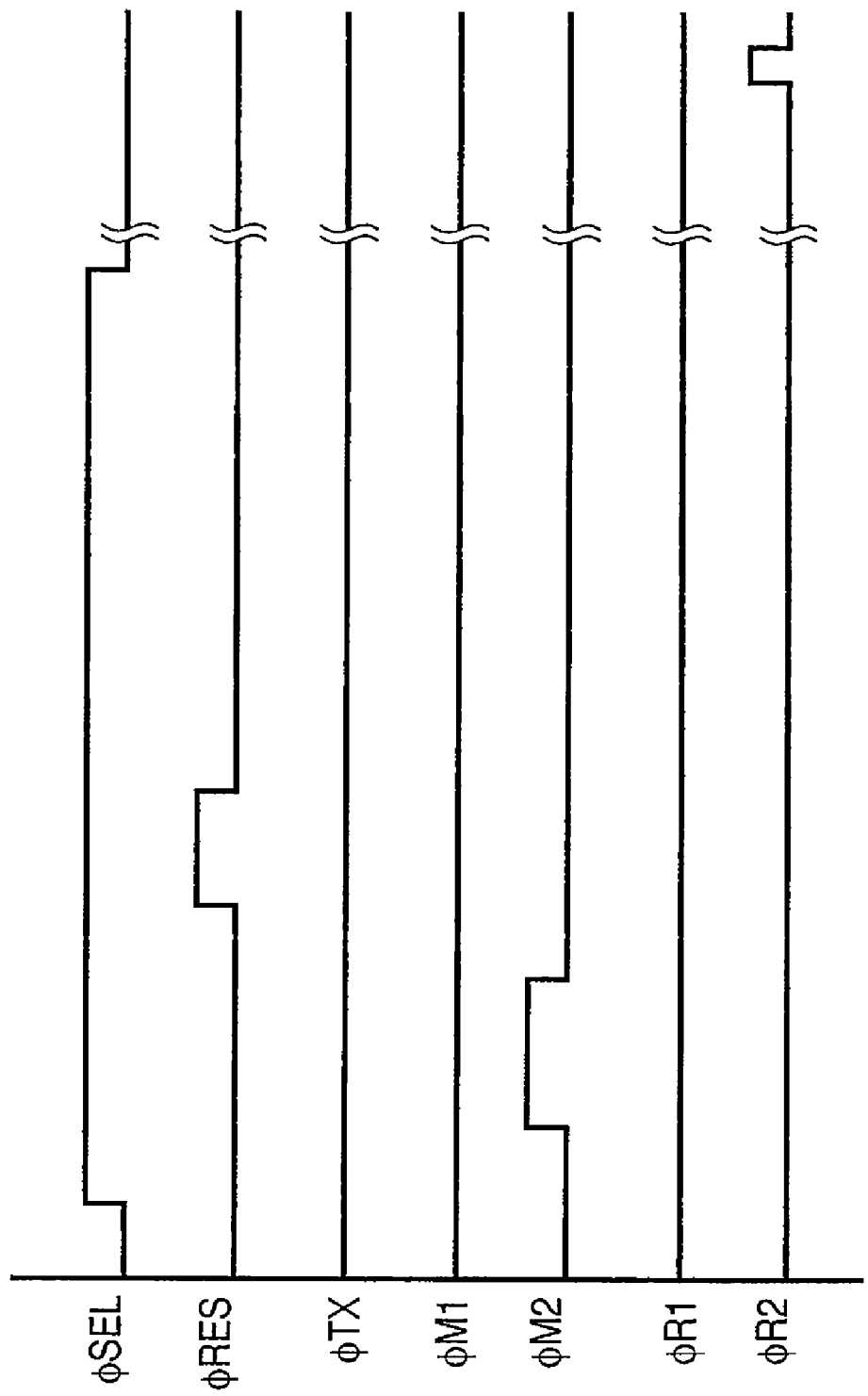
FIG. 7 is a timing chart for driving the image sensor during charge accumulation according to the second embodiment of the present invention.

The timing for driving the image sensor 55 in step S202 at this time is shown in FIG. 7.

When selecting a certain pixel, the selection switch 7 of the pixel to be selected is turned on by setting the selection pulse φSEL to high. Because the FD portion 3 is composed of a diffusion region, similarly to the PD 1, which is an ordinary photoelectric converter, electron-hole pairs constituting optical signal charge are generated by incident stray light and heat as described above. Consequently, the FD portion 3 works equivalently as a photoelectric converter. Signal charge is thus generated in the FD portion 3 by small light emissions and heat generated by the devices and circuitry in the image sensing apparatus, and the charge (noise component) caused by these factors is accumulated.

The charge (noise component) thus accumulated in the FD portion 3 undergoes charge/voltage conversion by the FET 6 prior to the charge of the PD 1 being transferred via the transfer switch 2, and a voltage corresponding to the charge is output to the vertical output line 8. By setting the memory pulse φM2 to high and connecting the switch 15 to the vertical output line 8 in this state, a voltage corresponding to the read charge of the noise component is temporarily stored in the condenser 14.

Then, the reset switch 4 is turned on by setting the reset pulse φRES to high, resetting the FD portion 3 to a prescribed reset voltage. Next, the switch 15 is connected to the readout line 16 by setting the readout pulse φR2 to high, and a voltage corresponding to the charge of the noise component is output to the readout line 16 and output via the output amplifier 17 as a noise signal.

The noise signal thus output from the image sensor 55 is converted to digital data by the A/D converter 59, and sent to the digital signal processor 60 of FIG. 1 as a noise image showing the noise level and region.

When a noise image is output as described above in step S202, the noise image is stored in the digital signal processor 60 in step S203 without further processing if this was the first reading out of a noise image, since there is still no noise image to add to. The processing then proceeds to step S204, where it is checked whether the set charge accumulation period has ended. If the charge accumulation period has not ended, the processing returns to step S201, and after standing by for a prescribed period (until judged "YES" in step S201), a noise image is read out in step S202 as described above with reference to FIG. 7. The noise image read out from the second loop onwards is added in step S203 to the noise image stored in the digital signal processor 60. After adding the noise image, the processing proceeds to step S204. Here, if the charge accumulation period has ended, the processing proceeds to step S205, whereas if the charge accumulation period has not ended, the processing returns to step S201 and the above processing is repeated.

In step S205, the charge after the end of the charge accumulation period is read out. Since this processing is similar to that described with reference to the timing chart of FIG. 4 in the first embodiment, description will be omitted here. In the second embodiment, however, the charge accumulation period of the noise image differs from the charge accumulation period of the optical output image read out in step S205, since the noise image is read out in step S202 and step S203 at prescribed time intervals.

Therefore, in step S205 in the second embodiment, the read noise image is added to the stored noise image in the digital signal processor 60 to acquire the final noise image. The noise correction operation described with reference to FIG. 5 is performed in the digital signal processor 60 based on the optical output image and noise image thus obtained.

According to the second embodiment as described above, the saturation of the charge of the noise component in the FD portion 3 with a long charge accumulation period, which occurs if dark current is generated with greater intensity in the FD portion 3 compared to the PD 1, can be prevented, since the noise signal is read out over a plurality of times during the charge accumulation period.

Note that in the present embodiment, by making the signal path for outputting the noise signal the same as the signal path for outputting the optical signal, susceptibility to noise such as extraneous noise is reduced, enabling an excellent image signal to be obtained.

Also, while a median process is performed on the noise image in the present embodiment, the median process need not be performed in sensors without pixel defects. In this case, fixed pattern noise generated per pixel can be corrected by performing a subtraction process with a noise image that has only undergone gain correction.

While the median process was performed on a 5×5 pixel range, the range may be varied to obtain a better image.

Third Embodiment

A third embodiment of the present invention will be described next.

Note that since the basic device configuration in the third embodiment is similar to that described with reference to FIGS. 1 to 3B in the first embodiment and the drive timing of the image sensor is similar to that described with reference to FIG. 4, description thereof will be omitted.

The optical and noise signals output from the image sensor 55 as a result of the drive by the pulses shown in FIG. 4 are converted to digital data by the A/D converter 59, and sent to the digital signal processor 60 of FIG. 1 as an optical output image based on the optical signal and a noise image showing the noise level and region based on the noise signal.

A process of correcting the defective pixel signal executed in the digital signal processor 60 in the third embodiment will be described next, with reference to the flowchart of FIG. 8.

Firstly, in step S11 saturated pixels are detected from the noise image, and it is further judged whether adjacent pixels are saturated. Saturated pixels are detected in such a manner that each noise signal value of the noise image is compared with a preset value or an average signal value of the noise image, and the pixels whose noise signal values are greater than the preset value or the average signal value are determined as saturated. The present invention is, however, not restricted in terms of the method for detecting saturated pixels, and saturated pixels may be detected using a known method.

If adjacent pixels are saturated it is judged that the pixel saturation has occurred because the object is bright, and the routine is ended without further processing. This is because light from the object is diffused as a result of passing through the lens 51 and the optical filter 54 such as a low-pass filter, so the area saturated by light from the object will not be the size of one pixel. In contrast, saturation resulting from the dark current of a defective pixel is isolated to a single pixel.

Therefore, it can be judged whether the saturation is due to a defective pixel or to light from the object by the size of the saturated area.

If it is judged in step S11 that the saturated pixels are isolated, or in other words, that the saturated pixels are not adjacent, the processing proceeds to step S12, where the signal level of a prescribed proportion "a" of the noise signal level of each saturated pixel is subtracted from the optical signals of pixels adjacent to the saturated pixel in the optical output image. The prescribed proportion "a" equates to the proportion of the output level exceeding saturation that leaks into an adjacent pixel, when the dark current of a defective pixel is saturated by the long accumulation of charge. In the case of there being one saturated pixel, it can be judged that saturation is caused by the dark current of the defective pixel, rather than by the luminance of the object, and it is presumed that there will be a significant difference between the signal level of a defective pixel and the signal level of adjacent pixels.

This correction enables the actual optical signals of pixels adjacent to a defective pixel to be obtained, and image quality degradation prevented.

Next, the processing proceeds to step S13, where it is judged that pixels saturated in isolation are defective pixels, and the optical signals of the defective pixels in the optical output image are interpolated using the optical signals of neighboring pixels of the same color, after which this processing is ended.

This enables the optical signals of defective pixels and neighboring pixels to be appropriately corrected in the case where defective pixels are saturated.

Figure 8:
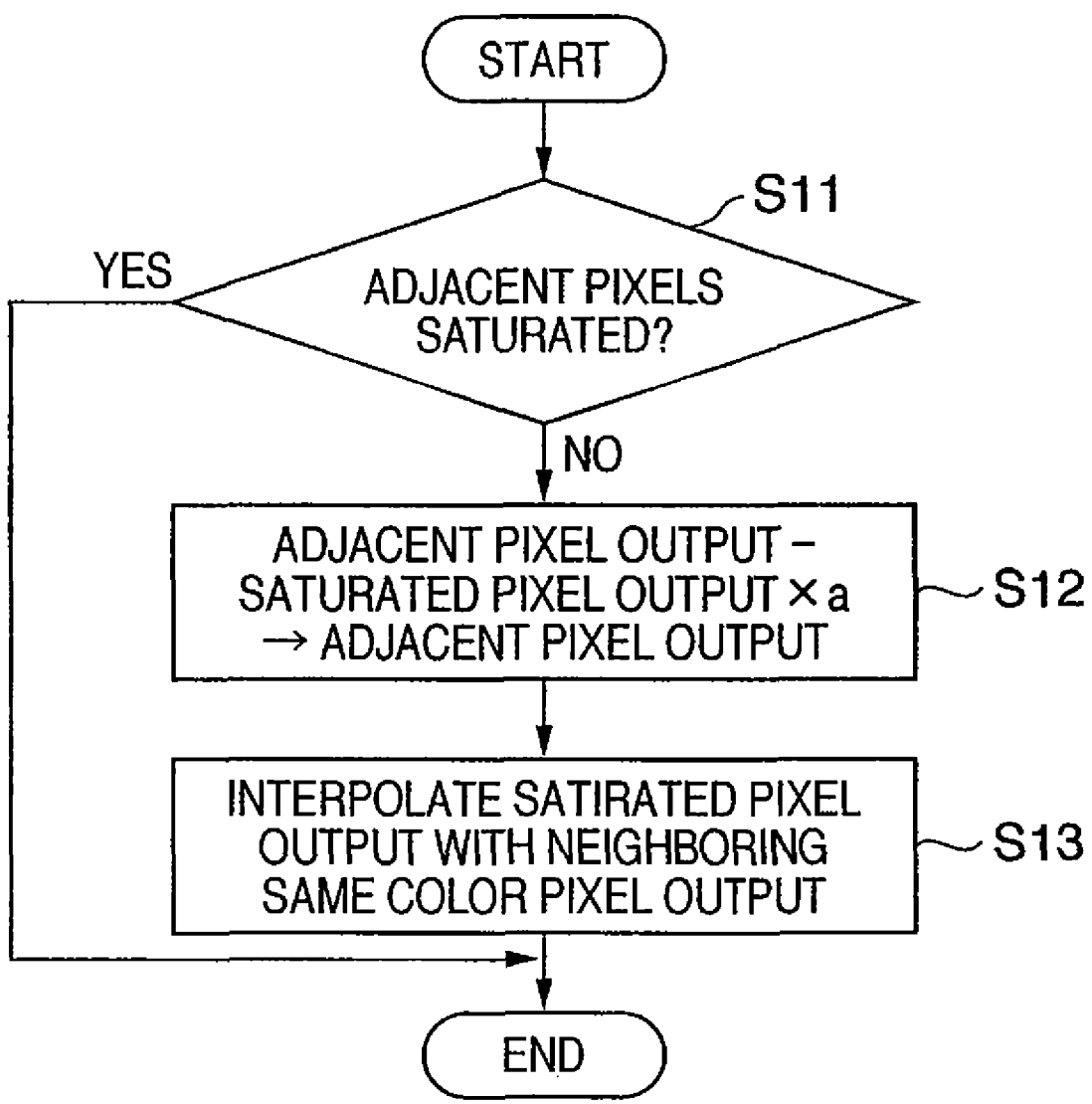
FIG. 8 is a flowchart for illustrating a process of correcting a defective pixel signal according to a third embodiment of the present invention.

Note that while in the third embodiment it is judged in step S11 of FIG. 8 whether a saturated pixel is a defective pixel, this judgment can be used in expanding the dynamic range. For example, if a saturated pixel is not a defective pixel, the dynamic range can be expanded by adding the noise signal of the saturated pixel to the optical signal.

Fourth Embodiment

A fourth embodiment of the present invention will be described next, with reference to the drawings.

Note that since the basic device configuration in the fourth embodiment is similar to that described with reference to FIGS. 1 to 3B in the first embodiment and the drive timing of the image sensor is similar to that described with reference to FIG. 4, description thereof will be omitted.

Figure 9:
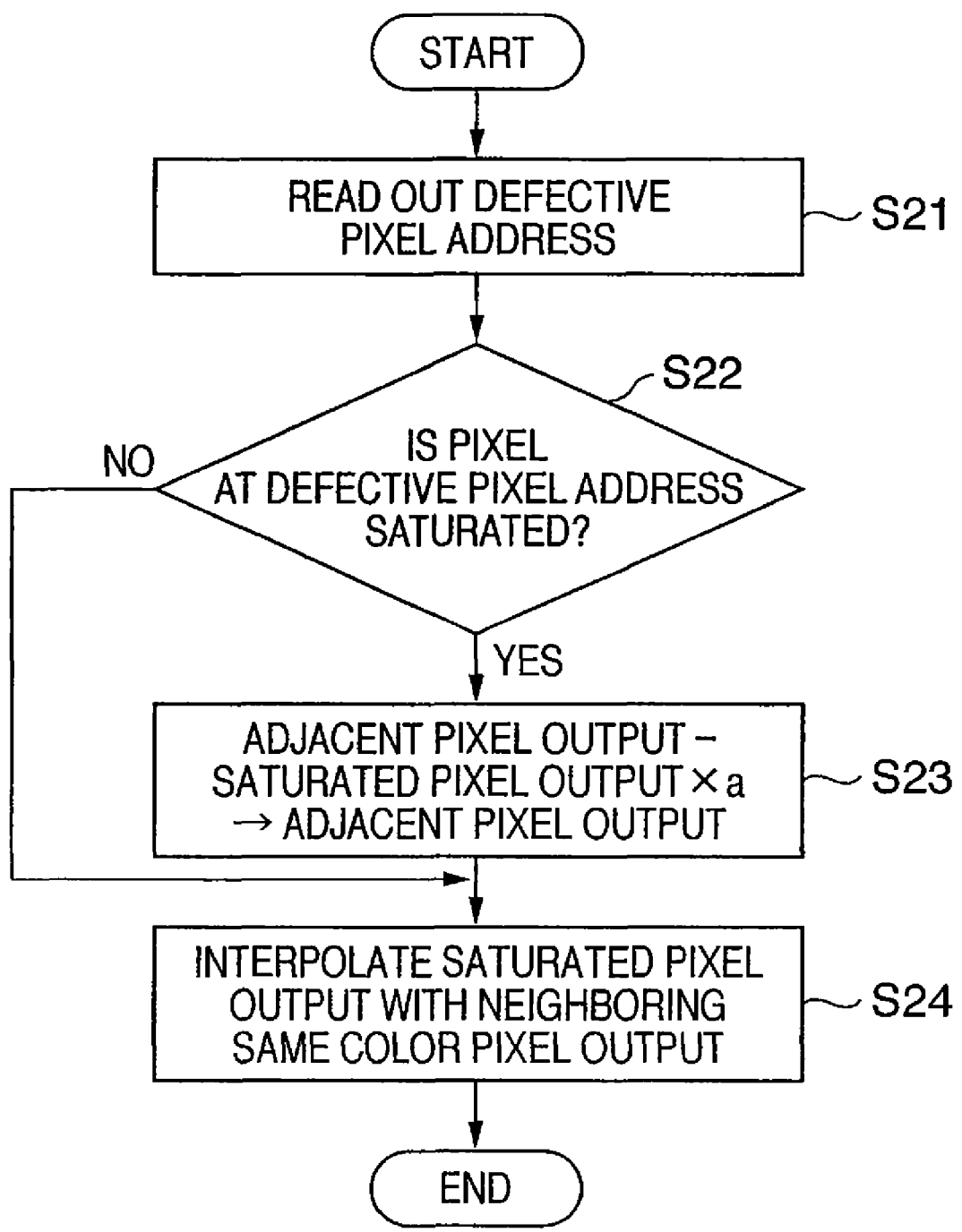
FIG. 9 is a flowchart for illustrating a process of correcting a defective pixel signal according to a fourth embodiment of the present invention.
Figure 10:
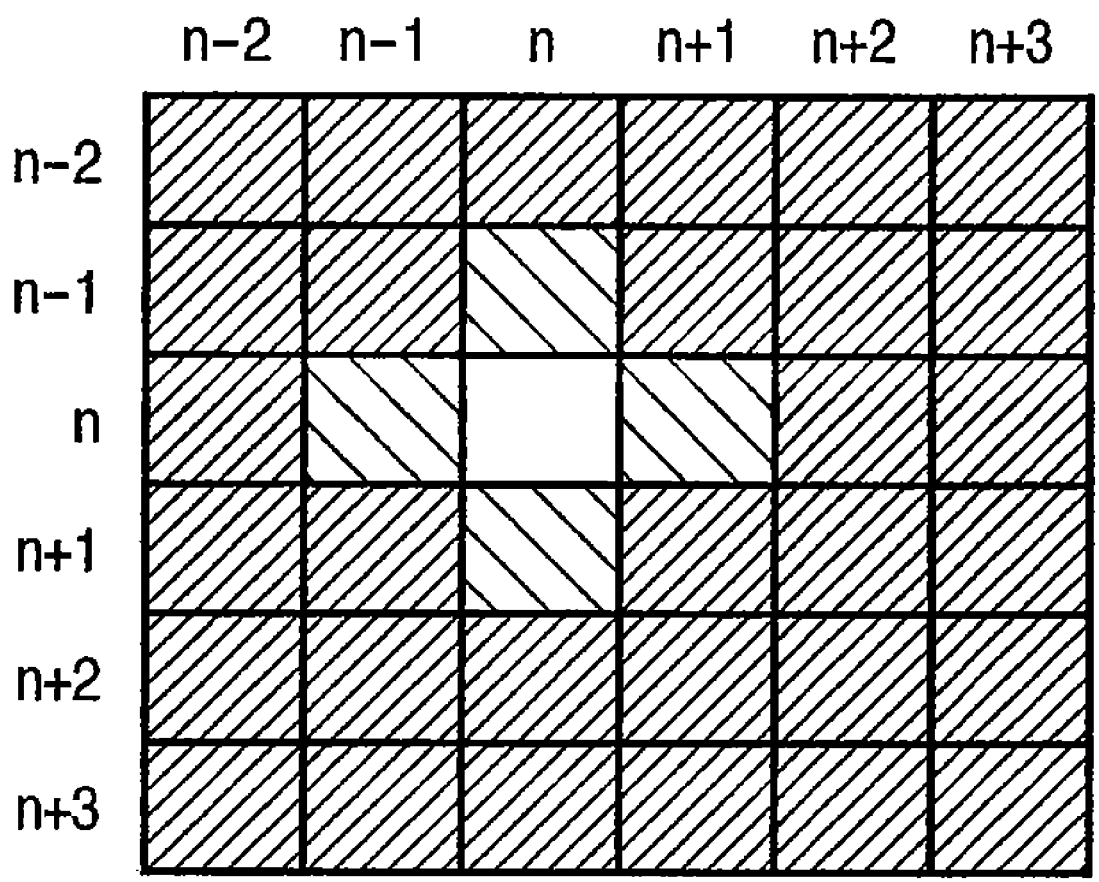
FIG. 10 shows an example of charge having leaked into neighboring pixels as the result of a defective pixel becoming saturated.

FIG. 9 is a flowchart for illustrating a process of correcting a defective pixel signal performed by the digital signal processor 60 of FIG. 1 in the fourth embodiment of the present invention.

Firstly, in step S21, the addresses of defective pixels pre-stored in a memory (not shown) are read out, as disclosed in Japanese Patent Laid-Open No. 2003-333435, for example. In the fourth embodiment, however, it is sufficient if the addresses of defective pixels are stored, without it being necessary to store the output levels. Next, the processing proceeds to step S22, where it is judged whether the defective pixels are saturated, based on the level of the noise signals of the pixels in the noise image corresponding to the read addresses of the defective pixels. Note that this judgment can be performed using a similar method to when saturated pixels are detected in step S11 of FIG. 8.

If the defective pixels are not saturated in step S22, it is judged that there is no leakage of saturated signals into adjacent pixels, and the processing proceeds to step S24 without correcting the adjacent pixels. If judged in step S22 that the defective pixels are saturated pixels, the processing proceeds to step S23, where the signal level of a prescribed proportion "a" of the noise signal level of each defective pixel is subtracted from the optical signals of pixels adjacent to the defective pixel in the optical output image. The prescribed proportion "a" equates to the proportion of the output level exceeding saturation that leaks into an adjacent pixel, when the dark current of a defective pixel is saturated by the long accumulation of charge. If the defective pixels are saturated, it is presumed that the difference between the signal levels of the defective pixels and the signal levels of adjacent pixels will be significant. This correction enables the actual optical signals of pixels adjacent to a saturated pixel to be obtained, and image quality degradation prevented.

Next, the processing proceeds to step S24, where the optical signals of the defective pixels in the optical output image are interpolated using the optical signals of neighboring pixels of the same color, after which this processing is ended.

The amount of leakage of a saturated signal to adjacent pixels is assumed to be constant, although it may be varied according to the image sensing environment.

Additional Embodiments

Note that the present invention may be applied to a system constituted by a plurality of devices (e.g., image sensing apparatus, interface devices, computers), or an apparatus composed of a single device (e.g., image sensing apparatus). If constituted by a plurality of devices, the optical output signal and the noise signal output from the analog front end 56 of the image sensing apparatus can be output to the external computer 71 without further processing, and undergo the processing of FIGS. 5, 6, 8 and 9 in the external computer 71.

Furthermore, the invention can be implemented by supplying a software program, which implements the functions of the foregoing embodiments, directly or indirectly to a system or an apparatus, reading out the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Examples of storage media that can be used for supplying the program are a floppy disk, a hard disk, an optical disk, a magneto-optical disk, a CD-ROM, a CD-R, a CD-RW, a magnetic tape, a nonvolatile type memory card, a ROM, and a DVD (DVD-ROM and a DVD-R).

As for the method for supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read out from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-291715 and 2006-291718, both filed on Oct. 26, 2006, which are hereby incorporated by reference herein in their entirety.

What is claimed is:

1. An image sensing apparatus comprising:
an image sensor provided with a plurality of pixels each having
a photoelectric converter that receives light from an object and accumulates signal charges;
a semiconductor region to which the signal charges are transferred from said photoelectric converter;
a transfer unit that transfers the signal charges from said photoelectric converter to said semiconductor region;
a readout unit that reads out a voltage signal corresponding to the signal charges in said semiconductor region; and
a reset unit that resets said semiconductor region;
a control unit that controls said readout unit to read out a voltage signal corresponding to second signal charges which are accumulated in said semiconductor region during accumulation of first signal charges by said photoelectric converter before said reset unit resets said semiconductor region, said transfer unit to transfer the first signal charges from said photoelectric converter to said semiconductor region after said semiconductor region has been reset by said reset unit, and said readout unit to read out a voltage signal corresponding to the first signal charges; and a correction unit that corrects the voltage signal corresponding to the first signal charges based on the voltage signal corresponding to the second signal charges.

2. The image sensing apparatus according to claim 1, wherein said correction unit subtracts a signal of a preset proportion of the voltage signal corresponding to the second signal charges from the voltage signal corresponding to the first signal charges.

3. The image sensing apparatus according to claim 1, further comprising a reset unit that resets said semiconductor region, wherein the first signal is transferred from said photoelectric converter by said transfer unit after said semiconductor region has been reset by said reset unit.

4. A correction method for correcting a signal obtained from an image sensor provided with a plurality of pixels each having a photoelectric converter that receives light from an object and accumulates a signal charges, a semiconductor region to which the signal charges are transferred from said photoelectric converter, a transfer unit that transfers the signal charges from the photoelectric converter to the semiconductor region, a first readout unit that reads out a voltage signal from the semiconductor region before transferring the first signal by the transfer unit, and a second readout unit that reads out the first signal corresponding to the signal charges in the semiconductor region and a reset unit that resets said semiconductor region, said method comprising:

a first readout step of reading out a voltage signal corresponding to second signal charges which are accumulated in said semiconductor region during accumulation of first signal charges by said photoelectric converter before said reset unit resets said semiconductor region;

a transfer step of transferring the first signal charges from said photoelectric converter to said semiconductor region after said semiconductor region has been reset by said reset unit;

a second readout step of reading out a voltage signal corresponding to the first signal charges; and a correction step of correcting the voltage signal corresponding to the first signal charges based on the voltage signal corresponding to the second signal charges.

5. The correction method according to claim 4, wherein in said correction step, a signal of a preset proportion of the voltage signal corresponding to the second signal charges is subtracted from the voltage signal corresponding to the first signal charges.

6. The correction method according to claim 4, further comprising a reset step of resetting the semiconductor region, wherein in said first readout step, the first signal is transferred from the photoelectric converter by the transfer unit after the semiconductor region has been reset in said reset step.

* * * * *